(12) United States Patent  
Ichihara et al.

(10) Patent No.: US 7,093,426 B2
(45) Date of Patent: Aug. 22, 2006

(54) STARTING APPARATUS, STARTING METHOD, CONTROL METHOD AND EXHAUST FILTRATION APPARATUS OF INTERNAL COMBUSTION ENGINE

(75) Inventors: Takanobu Ichihara, Hitachinaka (JP); Masami Nagano, Hitachinaka (JP); Kozo Katogi, Hitachi (JP); Hiroaki Saeki, Hitachinaka (JP)

(73) Assignees: Hitachi, Ltd., Tokyo (JP); Hitachi Car Engineering Co., Ltd., Hitachinaka (JP)

( * ) Notice: Subject to any disclaimer, the term of this patent is extended or adjusted under 35 U.S.C. 154(b) by 0 days.

(21) Appl. No.: 10/621,619

(22) Filed: Jul. 18, 2003

(65) Prior Publication Data

US 2004/0016416 A1 Jan. 29, 2004

(30) Foreign Application Priority Data

Jul. 18, 2002 (JP) ............................. 2002-209909

(51) Int. Cl.
*F01N 3/00* (2006.01)
(52) U.S. Cl. .............................. 60/285; 60/274; 60/297
(58) Field of Classification Search ................ 60/274, 60/285, 297, 311; 123/302, 308, 520
See application file for complete search history.

(56) References Cited

U.S. PATENT DOCUMENTS 4,479,476 A * 10/1984 Suzuki et al. ............... 123/478

5,564,387 A * 10/1996 Igarashi et al. .......... 123/339.23
5,632,249 A * 5/1997 Sadakane et al. ............ 123/442
5,697,337 A * 12/1997 Takahashi et al. ....... 123/339.11
5,878,711 A * 3/1999 Kamura et al. .............. 123/295

FOREIGN PATENT DOCUMENTS

| JP | 63-150465 | 6/1988 |
| JP | 7-139455 | 5/1995 |
| JP | 07-139455 | * 5/1995 |

* cited by examiner

*Primary Examiner*—Thomas Denion
*Assistant Examiner*—Diem Tran
(74) *Attorney, Agent, or Firm*—Crowell & Moring LLP

(57) ABSTRACT

To improve startability and reduce the amount of HC emission at start-up with the aid of a construction where vaporized fuel is supplied to the bypass passage that bypasses the main passage.

The main air control valve 16 is installed near the intake port 10 of the main air passage 3, and the main air control valve is closed or throttled at the time of start-up or additional injection from the port injection valve 5 is given in the beginning of start-up cranking. With a apparatus equipped with the main air control valve, vaporization of the fuel injected from the auxiliary injection valve 6 is facilitated in the beginning of cranking and also intake delay of the vaporized fuel is reduced, and hence startability can improve and the amount of HC emission at the time of start-up can decrease. With a apparatus where additional injection is given from the port injection valve 5 in the beginning of cranking, fuel supply into the cylinder is achieved quickly, and hence startability can improve and the amount of HC emission at the time of start-up can decrease.

7 Claims, 10 Drawing Sheets

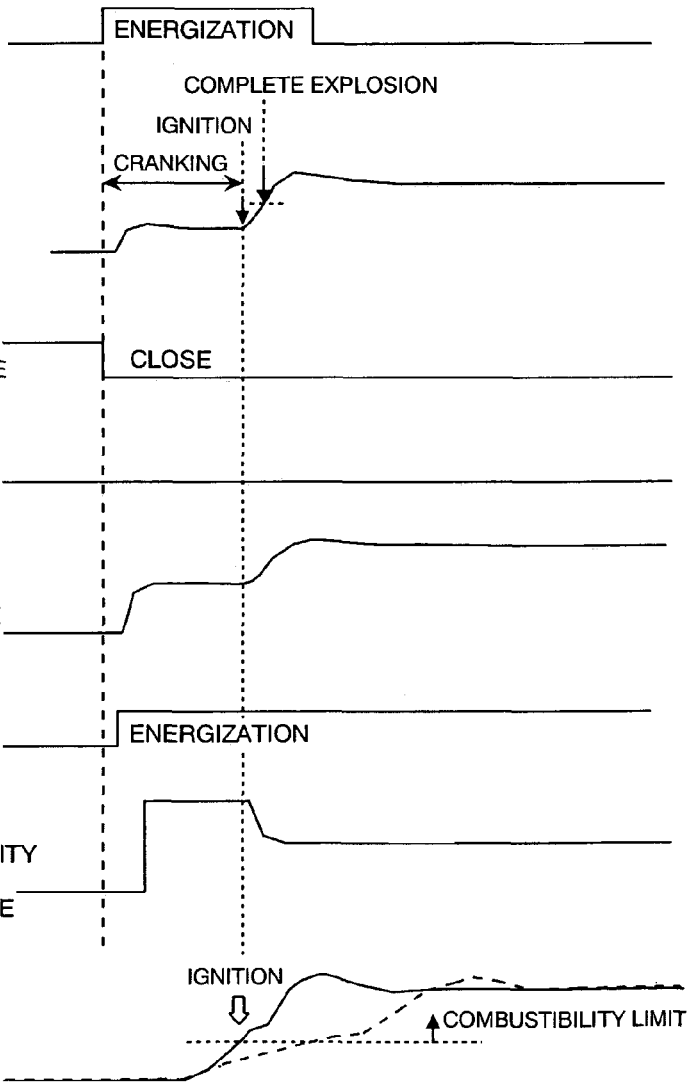

FIG. 3j  STARTER 

FIG. 3a  ENGINE REVOLUTION 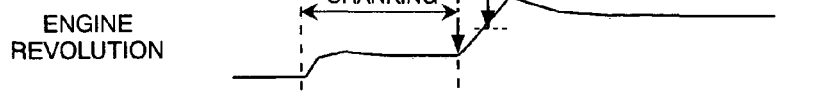

FIG. 3b  THROTTLE VALVE 

FIG. 3c  INFLOW AIR FROM MAIN PASSAGE 

FIG. 3d  INFLOW AIR FROM BYPASS PASSAGE 

FIG. 3e  INFLOW FUEL FROM BYPASS PASSAGE 

FIG. 3f  HEATER 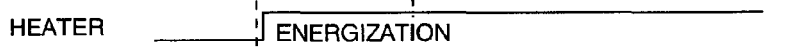

FIG. 3g  INJECTION QUANTITY OF AUXILIARY INJECTION VALVE 

FIG. 3h1  INJECTION QUANTITY OF PORT INJECTION VALVE 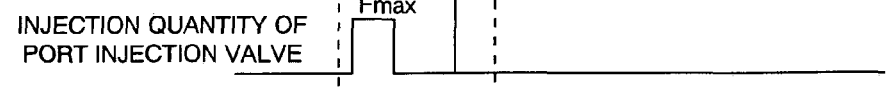

FIG. 3i  INFLOW FUEL QUANTITY INTO CYLINDER 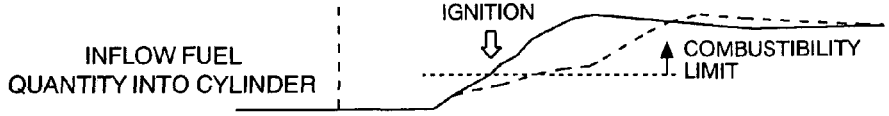

FIG. 3h2 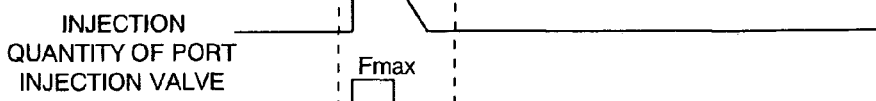

INJECTION QUANTITY OF PORT INJECTION VALVE

FIG. 3h3 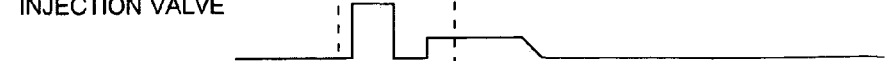

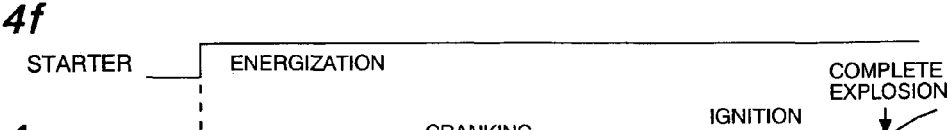
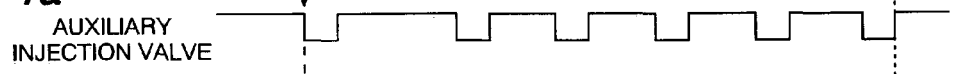
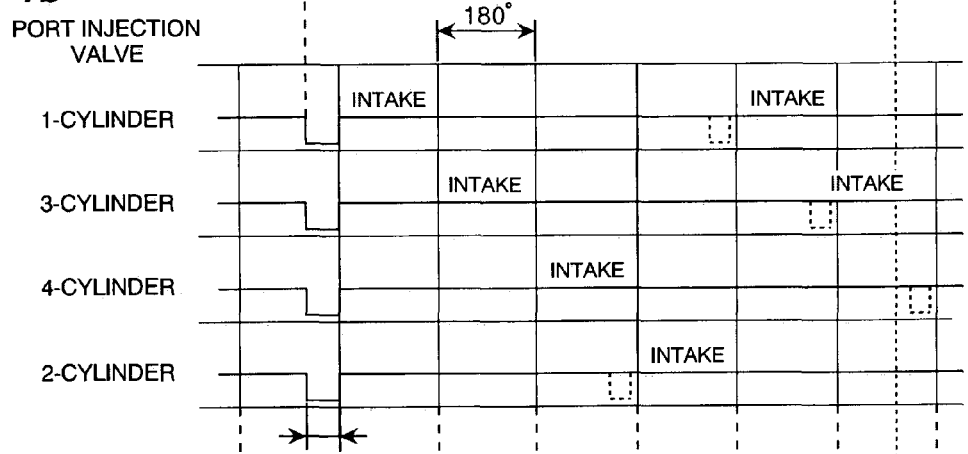
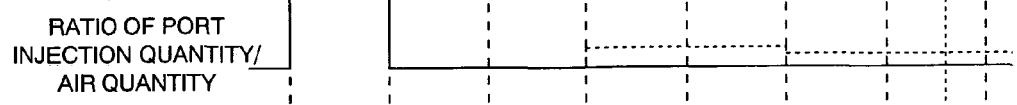
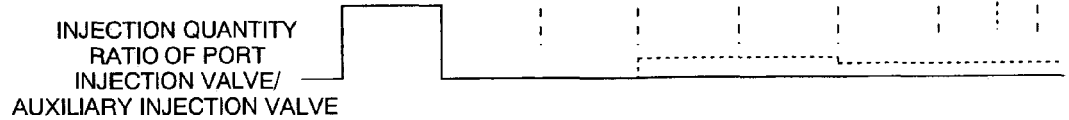

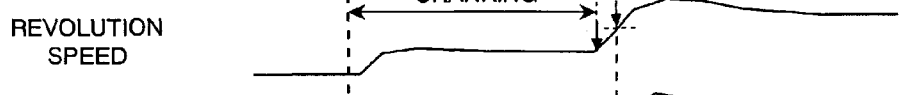
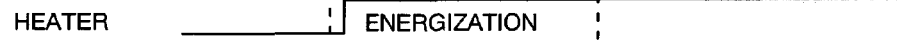
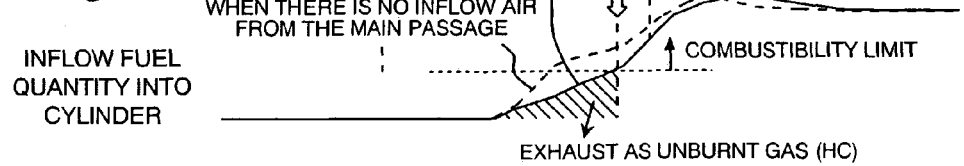

STARTING APPARATUS, STARTING METHOD, CONTROL METHOD AND EXHAUST FILTRATION APPARATUS OF INTERNAL COMBUSTION ENGINE

BACKGROUND OF THE INVENTION 1. (Field of the Invention)

The present invention relates to a starting apparatus, a starting method, and a control method of an internal combustion engine. They comprises a main air passage (intake air passage) for the engine, a bypass air passage provided in parallel to the main air passage, a means for supplying vaporized fuel to the bypass air passage at the time of start-up cranking, and also to an exhaust filtration apparatus of an internal combustion engine equipped with the starting apparatus.

2. (Prior Art)

Generally, at the time of state where an internal combustion engine has not been warmed up yet (This state is called as "cold state of the engine" fuel injected from the injection valve mostly adheres onto the intake passage wall and cylinder wall of the engine. Accordingly air-fuel mixture around the ignition plug in the cylinder becomes leaner, thereby ignitability and combustibility of the fuel deteriorate. If the fuel supply is increased so as to prevent the leanizing of air-fuel mixture around the ignition plug, more fuel adheres onto the cylinder wall. Accordingly after the warming up of the engine, excessive fuel is supplied to the engine, and a lot of unburnt vaporized (HC) is exhausted.

Prior arts for preventing this problem are disclosed in the Japanese Application Patent Laid-open Publication No. Sho 63-150465 (1988) and Hei 7-139455 (1995). These prior arts have an auxiliary injection valve and an electric heater installed in a bypass passage that bypasses the throttle valve in the intake air passage. The heater is energized at the time of a cold state of the engine to facilitate vaporization of the fuel. Hence no fuel adhesion is caused, and it prevents the combustion of the engine at start-up from deteriorating, and HC emission is reduced. In these prior arts, at the starting time of the engine, a throttle valve installed in the main air passage closes, and the bypass air control valve installed in the bypass passage (here, the cross area of the bypass passage is smaller than that of the main intake air passage) opens. Thereby the high-velocity airflow is generated in the bypass passage, and so atomization of the flowing fuel and vaporization of the fuel adhered onto the heater surface can be facilitated. Further, no heater is installed in the main air passage. Accordingly the resistance of the airflow passage at high velocity becomes lower, and the fall of engine power can be also prevented.

In an ordinary multi-point injection (MPI) system, liquid fuel is injected atomizing by a fuel injection valve installed near the intake port of each engine cylinder. The injected fuel mostly adheres onto the intake passage wall, the intake valve and the cylinder wall. The fuel adhesion onto these walls causes to decrease the fuel amount to be supplied in a gaseous phase around the ignition plug. Hence, the ignitability and combustibility are deteriorated. On the contrary, with a system where fuel is heated and vaporized by a heater and then supplied to the cylinder, it is generally known that, because no fuel adheres onto walls, the ignitability and combustibility improve remarkably, particularly at the time of the cold state of engine, and so unburnt vaporized (HC) emission reduces.

An example starting apparatus of a conventional internal combustion engine is explained hereunder, using FIG. 9. The intake passage of the internal combustion engine comprising:

a main air passage 3, that consists of a intake passage 1, a surge tank 2, and a manifold passage 3a branched downstream of the surge tank 2 and connected to the intake ports 10 of respective cylinder (FIG. 9 shows one pipe among the manifold 3a), a bypass air passage 4 installed in parallel to the main air passage 3 and connected close to the intake port of each cylinder, fuel injection valves 5 installed near the intake ports of respective cylinders or installed directly in the respective cylinders, an auxiliary fuel injection valve 6 installed in the bypass air passage 4, and a bypass air control valve 7 capable of adjusting the incoming air quantity into the bypass air passage. A throttle valve 8 is installed in the intake passage 1 and an air cleaner 9 is installed upstream of the throttle valve 8. Besides, a heater 15 is provided to heat and vaporize the fuel injected from the auxiliary injection valve 6.

SUMMARY OF THE INVENTION (Problems to be Solved by the Invention)

With the construction shown in FIG. 9, when the engine is made start by using auxiliary injection valve 6, even if the throttle valve 8 in the intake passage 1 is closed from the beginning of start-up cranking, the air of the main air passage remains in the surge tank 2 and the manifold 3a in the downstream of the throttle valve 8. The remaining air flows into the cylinder 13, as shown in FIG. 10(c), for some period of time after the beginning of start-up cranking. The intake air quantity flowing into the engine at the time of start-up cranking is almost constant under a specified engine speed. Therefore the incoming air quantity from the bypass passage 4 to the engine decreases, as shown by a solid line in FIG. 10(d), because the air flows into the engine from the main passage 3 for a while. A dotted line in FIG. 10(d) represents the incoming air quantity from the bypass passage 4 to the engine in the case that no air flows in from the main passage 3.

The air velocity at the heater position and the variation of fuel vaporization ratio fuel are explained hereunder, making reference to FIG. 11 and FIG. 12.

When the air velocity at the heater position increases, the fuel vaporization increases as shown in FIG. 11, and when the air velocity at the heater surface increases in the intake stroke the fuel vaporization ratio increases as shown in FIG. 12. When the incoming air quantity from the bypass passage 4 decreases as shown by a solid line in FIG. 10(d), the vaporization ratio of fuel adhered onto the heater 15 decreases as the air velocity at the heater position decreases.

Even if energization of the heater 15 and fuel injection from the auxiliary injection valve 6 are begun immediately after the beginning of start-up cranking shown in FIGS. 10(e) and (f), neither vaporization of the fuel adhered onto the heater 15 nor atomization of the fuel injected is facilitated. Because the air velocity in the bypass passage 4 (on the heater surface) decreases in the beginning of cranking explained above, and incoming vaporized fuel flow into the cylinder 13 is delayed as a result of decreased air velocity in the bypass passage 4. Consequently, the incoming fuel into the cylinder 13 decreases as shown by a solid line in FIG. 10(g). Because of the above, there arises a problem that the time required from the beginning of cranking up to ignition and complete explosion becomes longer and so the startability deteriorates.

In addition, there arises another problem that, because the start of incoming fuel into the cylinder delays and ignition delays, the amount of unburnt vaporized (HC) emitted until the ignition increases as shown by a shaded area in FIG. 10(g). A dotted line in FIG. 10(g) represents the incoming fuel into the cylinder in the case that no air flows in from the main passage 3. Complete combustion herein means a timing that the engine speed after cranking and ignition reaches a stable idling speed (800 r/min, for example)

In short, with the above prior arts, because the remaining air of the surge tank and the manifold in the downstream of throttle valve in the main air passage flows into the engine cylinder for some period of time after the beginning of start-up cranking, even if the throttle valve in the main passage is closed at the time of start-up, the incoming air quantity from the bypass passage decreases for a while. Since neither atomization of the fuel injected from the auxiliary injection valve nor vaporization of the fuel adhered onto the heater is facilitated, fuel supply into the cylinder is delayed as a result of decreased air velocity in the bypass passage. Consequently the start-up time required from the beginning of start-up cranking up to complete explosion becomes longer and so the startability of the engine deteriorates. In addition, there arises another problem that, because the start of fuel quantity supplied to the cylinder delays and ignition delays, the amount of unburnt vaporized (HC) emitted until the ignition increases.

An object of the present invention, which has been made in view of the above problems, is to improve the startability of a system in which fuel is heated and vaporized by a heater at the start-up and then supplied to the cylinder. Another object is to provide a staring apparatus and a starting method of an internal combustion engine so as to improve the startability and reduce the HC emission at the start-up of the engine. Another object is to provide a control method of an internal combustion engine so as to be able to satisfy the startability and improve the fuel efficiency drastically when applied to an idling stop system. A further object is to provide an exhaust filtration apparatus of an internal combustion engine equipped with the above starting apparatus, with which HC absorbent can be disused or the amount of HC absorbent to be held can be reduced, deterioration of the filtration performance can be prevented or minimized, and simple construction becomes available so as to be able to simplify the car layout.

(Means for Solving the Problems)

In order to solve the above problems, the first starting apparatus of an internal combustion engine of the present invention comprises a main air passage, bypass air passage provided in parallel to the main air passage and connected close to the intake port of each cylinder, a vaporization fuel supply means for supplying vaporized fuel to the bypass air passage, and a bypass air control valve capable of controlling the incoming air quantity into the bypass air passage, wherein main air control valves for the main air passage are provided near intake ports in respective pipes of the intake manifold. Besides, the second starting apparatus of an internal combustion engine of the present invention is made according to the first starting apparatus above, wherein the bypass air control valve is opened at the time of start-up cranking of a starter motor, the main air passage is closed by the main air control valves, and vaporized fuel is supplied to the bypass air passage by the vaporization fuel supply means.

With the starting apparatus of an internal combustion engine of the present invention constructed as above, because the main air passage is throttled or closed at the time of start-up cranking and air flow into the bypass air passage is speeded up, the vaporization of fuel by the heater is immediately facilitated. Besides, because the air velocity in the bypass air passage increased, the vaporization fuel flows into the cylinder speedily and supplied to the cylinder quickly. Because of the above, ignition is achieved speedily and the start-up time required up to complete explosion can be reduced remarkably, and hence the startability can be improved and the amount of unburnt vaporized can be reduced.

The third starting apparatus of an internal combustion engine of the present invention comprises a main air passage, a bypass air passage provided in parallel to the main air passage and connected close to the intake port of each cylinder, a bypass air control valve that is capable of controlling the incoming air quantity into the bypass air passage and opened at the time of start-up cranking, a vaporization fuel supply means for supplying vaporized fuel to the bypass air passage, and fuel injection valves that are installed near respective intake ports of cylinders of the engine or installed directly in respective cylinders, and inject the maximum fuel quantity of themselves available in the cranking period within a specified length of time after the beginning of start-up cranking, and then decreases the injected fuel quantity or stops injection in the rest of the cranking period after injecting the maximum fuel quantity.

With the starting apparatus of an internal combustion engine of the present invention constructed as above, the bypass air control valve is opened at the time of start-up cranking so as to supply vaporized fuel to the bypass air passage. The maximum fuel of the starting injected from the fuel injection valve is done within, for example, 0.4 second after the beginning of start-up cranking, and then the injected fuel quantity is decreased or injection is stopped. Thereby not only the start-up time can be reduced so as to improve the startability but also the fuel efficiency can be reduced and the amount of unburnt vaporized in exhaust can be reduced.

In the fourth starting apparatus, as a preferable mode of a starting apparatus of an internal combustion engine of the present invention, the vaporization fuel supply means comprises an auxiliary fuel injection valve and heater for heating the fuel injected from the auxiliary fuel injection valve. With this construction, because the fuel injected from the auxiliary fuel injection valve is heated and vaporized by the heater, supplied as vaporized fuel to the bypass air passage, and then taken into each cylinder, no fuel adheres onto the walls and so the start-up time reduces and the startability improves.

The starting method of an internal combustion engine of the present invention comprises a main air passage, fuel injection valves that are installed near respective intake ports of cylinders of the engine or installed directly in respective cylinders, a bypass air passage provided in parallel to the main air passage and connected close to the intake port of each cylinder, a vaporization fuel supply means for supplying vaporized fuel to the bypass air passage, and a bypass air control valve capable of controlling the incoming air quantity into the bypass air passage, wherein at the time of start-up cranking, the bypass air control valve is opened and vaporized fuel is supplied to the bypass air passage from the vaporization fuel supply means, and the fuel injection valves inject the maximum fuel quantity of themselves available in the cranking period within a specified time after the beginning of start-up cranking, and a time for decreasing the injected fuel quantity or stopping the injection is set in the rest of the cranking period after injecting the maximum fuel quantity.

With the starting method of an internal combustion engine of the present invention constructed as above, because the injected fuel is supplied to the bypass air passage during start-up cranking and also additional injection from each fuel injection valve is performed at the beginning of the cranking period, the start-up time from start-up cranking up to complete explosion can reduce and the startability can improve. Besides, because the injection quantity from the fuel injection valve is decreased or injection is stopped in the rest of the cranking period after injecting the maximum injection quantity from the fuel injection valve, the startability can be improved and the amount of unburned vaporized including HC and CO in exhaust can be prevented from increasing.

The control method of an internal combustion engine of the present invention is that of an internal combustion engine equipped with any one of the first to fourth starting apparatus above, wherein the internal combustion engine is stopped automatically when a specified idling stop permissible conditions are satisfied, the bypass air control valve is opened and the start-up cranking is actuated by energizing the starter motor when a specified engine start conditions are satisfied after the engine has stopped by satisfaction of the specified idling stop permissible conditions, and the vaporized fuel is supplied to the bypass air passage from the vaporization fuel supply means during start-up cranking.

With the control method of an internal combustion engine of the present invention constructed as above, because the air velocity in the bypass passage is high when the bypass air control valve is opened, the fuel vaporization is facilitated and high startability can be maintained. And because the vaporization fuel is supplied and accordingly no fuel adheres onto the intake passage wall or the cylinder wall, the fuel amount supplied at start-up can be reduced and the fuel efficiency can be improved remarkably. For this reason, the control method is very much suitable to an idling stop system.

Another mode of the control method of an internal combustion engine of the present invention is that of an internal combustion engine equipped with the fourth starting apparatus, wherein the internal combustion engine is stopped automatically when the specified idling stop permissible conditions are satisfied, the heater is energized for a specified time when the specified heater energization conditions are satisfied, after that, a non-energization period of the heater is set, and also start-up cranking is actuated by energizing the starter motor when a specified engine start conditions are satisfied after the internal combustion engine has stopped by the satisfaction of the idling stop permissible conditions, and vaporized fuel is supplied to the bypass air passage from the vaporization fuel supply means during start-up cranking.

With the control method of an internal combustion engine of the present invention constructed as above, because the heater is energized for a specified length of time to increase the heater temperature so that the vaporization of fuel can be achieved quickly at the next start-up, the startability improves. Besides, because another period for stopping energization of the heater is provided, the power consumption of the heater can be reduced. For this reason, the control method is very much suitable to an idling stop system.

The exhaust filtration apparatus of the present invention, installed in an exhaust pipe of an internal combustion engine equipped with any one of the first to the fourth starting apparatuses, consists of catalyst such as a catalytic converter rhodium that is made so as to hold no HC absorbent. With this construction, because unburnt vaporized emission from the starting apparatus of an internal combustion engine can be reduced, the exhaust filtration apparatus can be made only of catalyst such as catalytic converter rhodium and so the construction can be simplified and layout freedom of a car can be improved. Besides, deterioration of the filtration performance of the exhaust filtration apparatus can be prevented or minimized.

Another mode of the exhaust filtration apparatus of the present invention, installed in an exhaust pipe of an internal combustion engine equipped with any one of the first to the fourth starting apparatus, has one or more support containers on the exhaust pipe and the catalyst supports filled into one of the support containers hold HC absorbent. With this construction, because the filtration becomes possible by using HC absorbent that is held on the catalyst supports to be filled in one support container, the construction can be simplified and layout freedom of a car can be improved.

Another mode of the exhaust filtration apparatus of the present invention, installed in an exhaust tube of an internal combustion engine equipped with any one of the first to fourth starting apparatuses, has plural support containers in the exhaust pipe, and the catalyst supports filled into any one of the support containers, that are located in the downstream of the exhaust pipe compared to the support container located in most upstream of the same, hold HC absorbents. With this construction, because HC absorbents are located downstream, its deterioration due to high temperature can be prevented and increase of HC emission can be controlled.

BRIEF DESCRIPTION OF THE DRAWINGS

FIG. 2 is a timing chart showing the starting method of the starting apparatus shown in FIG. 1.

FIG. 3 is a Timing chart showing the starting method of the second embodiment of the starting apparatus of an internal combustion engine according to the present invention.

FIG. 4 is a Detailed timing chart of the starting method shown in FIG. 3.

FIG. 10 is a timing chart showing a conventional starting method of the starting apparatus shown in FIG. 9.

DETAILED DESCRIPTION OF THE INVENTION

Description of the Preferred Embodiments

Figure 1:
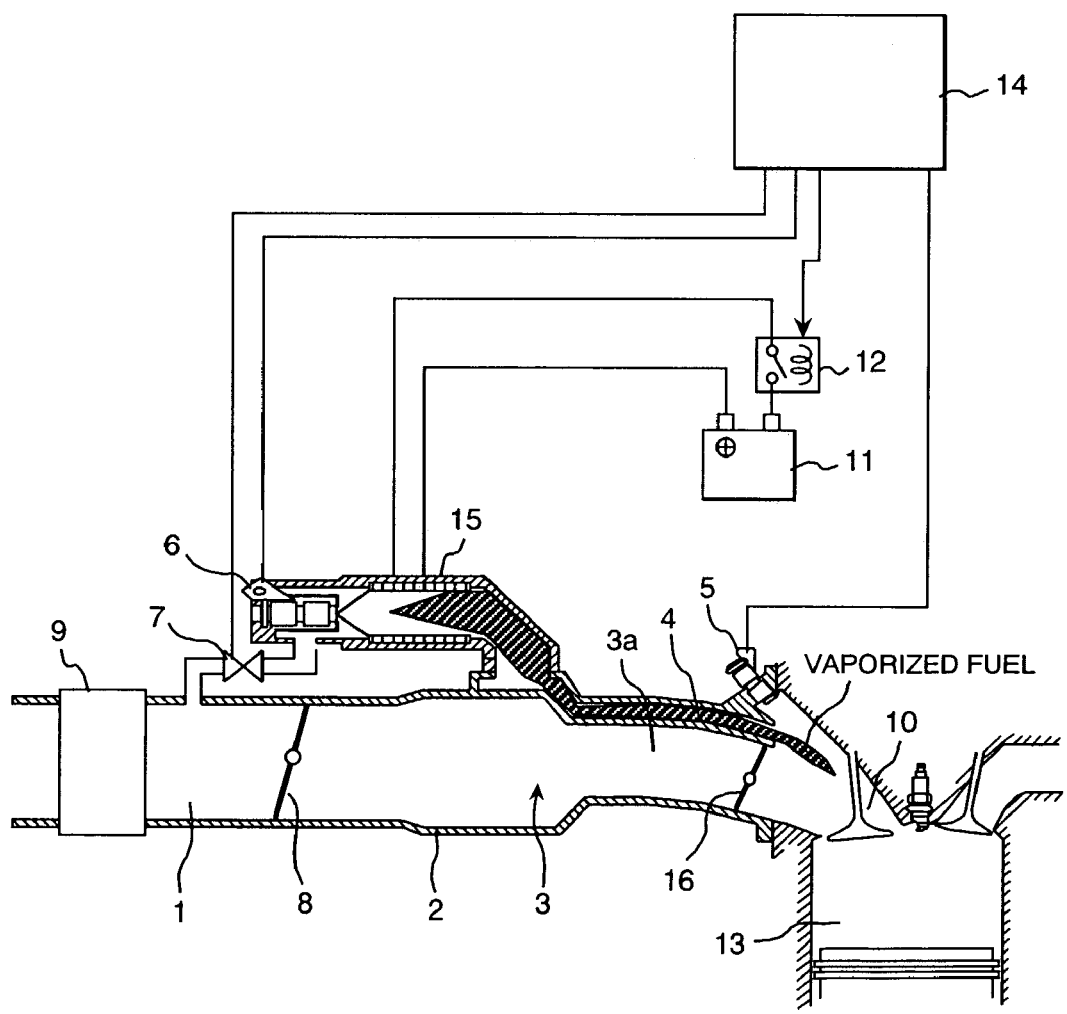
FIG. 1 is a structural drawing of main components showing the first embodiment of the starting apparatus of an internal combustion engine according to the present invention.

An embodiment of the starting apparatus of an internal combustion engine of the present invention is described hereunder, using figures. FIG. 1 is a structural drawing of main components showing the structure of the intake passage of the starting apparatus of an internal combustion engine of this embodiment. An air cleaner 9 is located in the upstream of the intake passage 1, and a throttle valve 8 is located downstream. The intake passage equipped with the throttle valve, a surge tank 2, and a manifold 3a, that is branched downstream of the surge tank and connected to the intake port 10 of each cylinder, are called the main air passage (hereinafter called main passage) 3.

A fuel injection valve (hereinafter called port injection valve) 5 that atomizes and supplies liquid fuel such as vaporizedoline and alcohol is installed near the intake port 10 of each cylinder of the engine.

Figure 9:
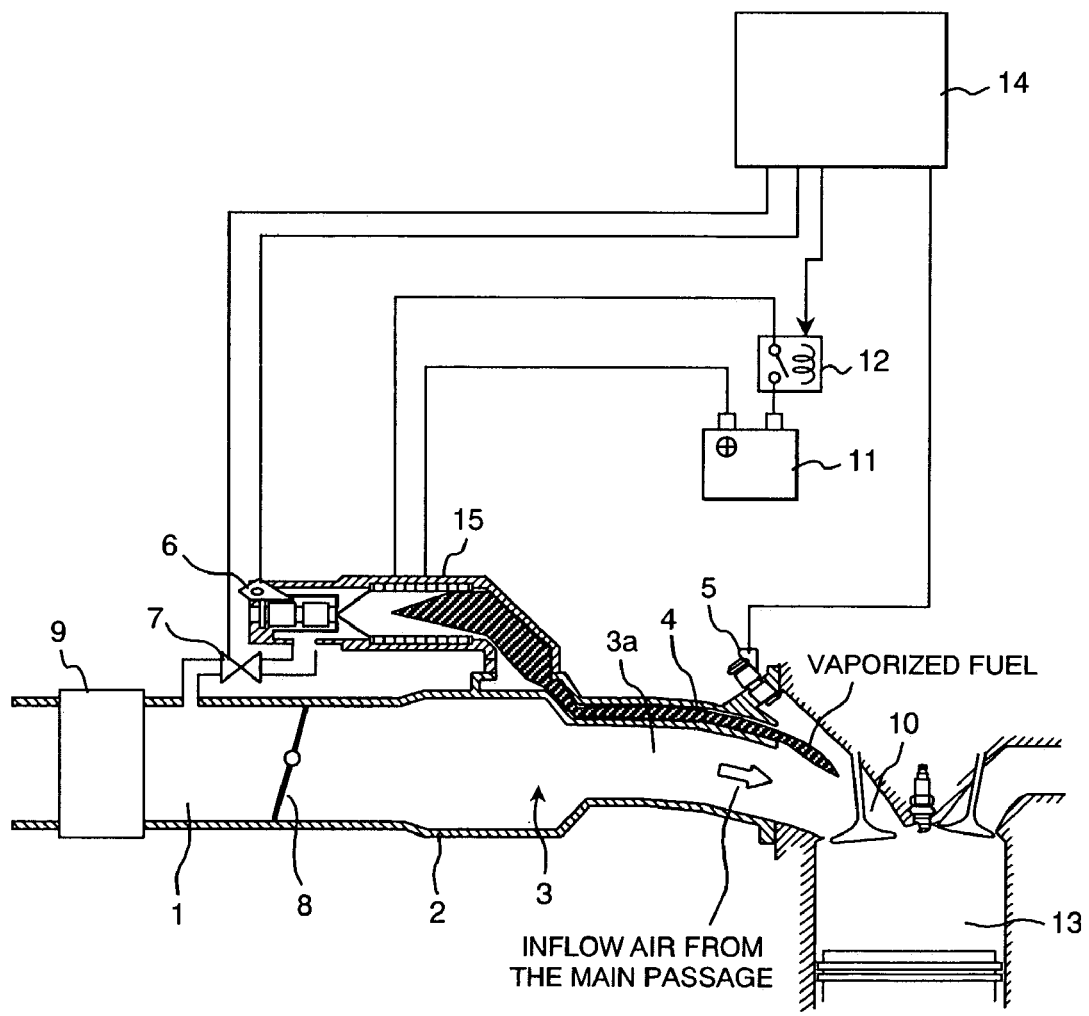
FIG. 9 is a structural drawing of main components showing a conventional starting apparatus of an internal combustion engine.

On the other hand, a bypass air passage (hereinafter called bypass passage) 4 is provided in parallel to the main passage 3. The bypass passage 4 is branched on the way (FIG. 1 and FIG. 9 shows one element among the branched bypass passage) and connected close to the intake port 10 of each cylinder. In the bypass passage 4, a bypass air control valve 7, an auxiliary fuel injection valve (hereinafter called auxiliary injection valve) 6 and heater 15 for heating and vaporizing the fuel injected from the auxiliary injection valve 6 are installed. The bypass air control valve 7 may be an ON/OFF control valve capably of only fully opening/ fully closing.

The heater 15 comprises a PTC heater (Positive Temperature Heater) or the like made of ceramic. It is possible to be heat up instantly by energizing so as to vaporize the fuel. The heater 15 may be flat plate type, cylindrical type, or grid type.

A heater relay 12 controls to energizing/non-energizing of the heater 15 and a battery 11 is the power source of the heater 15. Each injection valves 5 and 6, the bypass air control valve 7 and the heater relay 12 are controlled by a controller 14. There is also provided a starter motor (not shown) for start-up cranking. At the start-up, the starter motor gets energized by the driver's switching operation or by a starter control means such as the controller 14.

When fuel is heated and vaporized by the heater 15 and then supplied to each cylinder 13, the throttle valve 8 is closed and air is let into the bypass passage 4. The cross area of the bypass passage area is smaller than that of the intake passage 1 so that high velocity air flow is generated in the bypass passage 4, and, thereby vaporization of the fuel adhered onto the heater 15 surface and atomization of the injected fuel are facilitated. Because no heater is installed in the main passage 3, this construction has an advantage that the airflow resistance of the main passage at high velocity is lower and so the engine power reduction can be prevented.

To prevent the aforementioned deterioration of startability due to the incoming air from the main passage 3 at the beginning of cranking, in the first embodiment of the present invention, respective main air control valves 16 are provided near the intake ports 10 of respective engine cylinders (manifold 3a) as shown in FIG. 1. The main air control valves 16 is closed from the beginning of cranking so that the incoming air from the main passage 3 just after the beginning of cranking is shut off. An ON/OFF control valve capable only of fully opening/fully closing operation can generally be employed for the main aid control valves, but another type that can vary the passage area continuously is also acceptable.

In the first embodiment shown in FIG. 1, when the cranking shown in FIG. 2(a) begins, the main air control valves 16 in the main passage 3 as shown in FIG. 2(b) are closed and so no air comes in from the main passage 3 as shown in FIG. 2(c), but air is let into the bypass passage 4 as shown in FIG. 2(d). Because the vaporization ratio of the fuel adhered onto the heater 15 increases as the air velocity at the heater position increases, as explained before, when the heater 15 energizes on and the fuel injection from the auxiliary injection valve 6 begins after the cranking start as shown in FIGS. 2(e) and (f), the main air control valves 16 are closed and the air flow into the bypass passage 4 speeds up. And so vaporization of the fuel on the heater 15 is facilitated immediately and, because the air velocity in the bypass passage 4 increases, incoming fuel into the respective cylinders 13 speeds up. Because of this, the vaporization fuel is supplied to each cylinder speedily as shown in a bold line in FIG. 2(g) A dotted line here represents the incoming fuel quantity into each cylinder in the case where the main passage 3 is not equipped with the main air control valves and so air flows in from the main passage 3.

With a construction where the main air control valves 16 are closed, compared to a construction not equipped with the main air control valves 16, because the fuel vaporization at the beginning of cranking can be facilitated and also intake delay of the vaporization fuel into the cylinder 13 is reduced, as explained above, quicker ignition can be realized and the start-up time up to complete explosion can be reduced remarkably. Furthermore, because the incoming fuel quantity into the cylinder reaches a required level very quickly, the amount of unburnt vaporized (HC) emitted until ignition can be reduced.

Another effect of providing the main air control valves 16 are explained hereunder. The pressure of the intake port 10 decreases (negative pressure increases) in the intake stroke. And air comes in from the bypass passage 4 and main passage 3 in the case of FIG. 9, even if the throttle valve 8 is closed. Accordingly the air remaining in the main passage (surge tank 2 or intake manifold 3a) in the downstream of the throttle valve flows into the intake port 10.

Figure 12A:
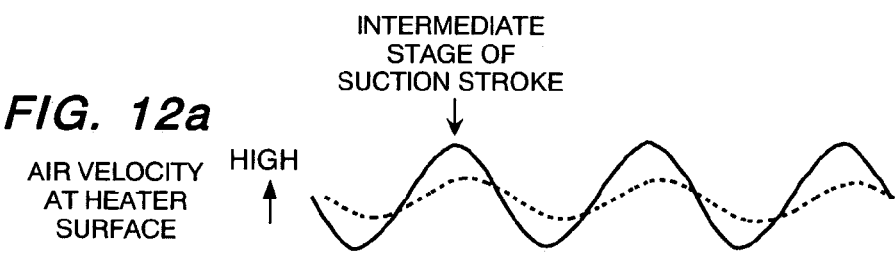
FIG. 12 is chart showing the relationship between air velocity and fuel vaporization ratio in the intake stroke.

Because the incoming air quantity into an engine at a certain timing in the intake stroke is almost constant at a specified revolution and load, the incoming air quantity from the bypass passage 4 decreases because of the incoming air from the main passage 3. And so the air velocity on the heater 15 surface decreases in the intermediate period of the intake stroke as shown by a dotted line in FIG. 12(a) (wherein a solid line represents the air velocity in the case no air comes in from the main passage 3).

Figure 11:
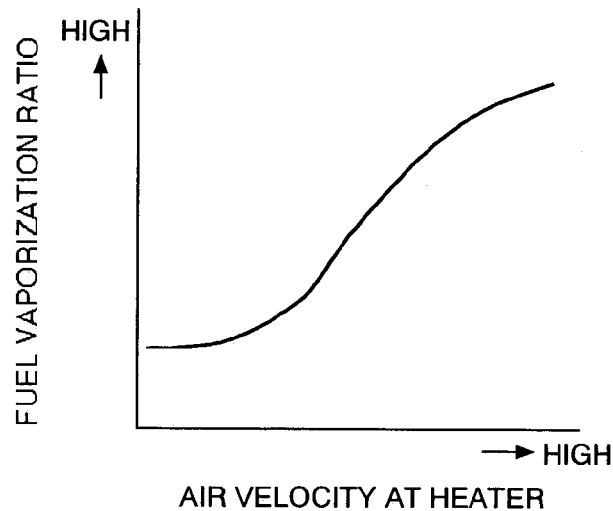
FIG. 11 is a chart showing the fuel vaporization characteristic that varies by the air velocity at heater.
Figure 12B:
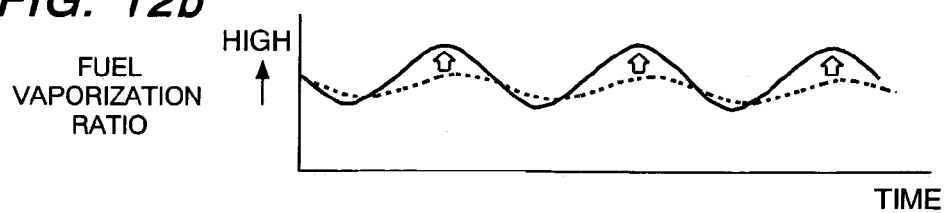

As explained before, if the air velocity at the position of the heater 15 decreases, the vaporization capacity of the heater 15 decreases. For this reason, with a conventional construction where air comes in from the main passage 3, the fuel vaporization capacity decreases as shown in a dotted line in FIG. 12(b). On the contrary, if no air comes in from the main passage 3, the air velocity on the heater 15 surface increases and so the fuel vaporization capacity improves in the intermediate period of the intake stroke. The air velocity in the first and latter periods of the intake stroke decreases, as compared to a construction where the air comes in from the main passage 3. As shown in FIG. 11, however, because variation of the fuel vaporization ratio is small at a portion with low air velocity, average fuel vaporization capacity improves in a construction where no air comes in from the main passage 3, compared to that in a construction where air comes in from the main passage 3. For this reason, by installing the main air control valves 16 near the intake port 10 in the main passage 3 and closing or throttling the main air control valves 16 at start-up, the fuel vaporization by the heater can be facilitated and so the startability and combustibility can be improved.

Although it is preferable that the main air control valves 16 for shutting the incoming air from the main passage 3 is fully closed during start-up cranking, the main air control valves 16 are not limited to fully closed position but may slightly be opened so far as an amount of air sufficient to maintain the startability can be let into the bypass passage 4 (or may be throttled at the time of start-up cranking to a smaller opening area than needed in normal driving mode).

The opening area of the main air control valves 16 can either be throttled in the beginning of start-up cranking (beginning of the starter motor energizing) or have already been throttled by start-up cranking (for example, after the key switch is turned on or after the engine is last stopped). Then, after start-up or after start of driving, the main air control valves 16 shall be opened.

The construction in FIG. 1 is applicable to an engine of the latest model which, not equipped with the throttle valve 8, controls the air quantity by varying the lift of the intake valve by motor. If the main air control valves 16 are installed near the intake port of each cylinder in the main passage 3, and the main air control valves 16 are closed to shut off the incoming air from the main passage 3, the startability can improve as in the previous example. The main passage above means a passage in which the main air control valves 16 are installed, and the bypass passage means a passage that bypasses each main air control valve 16.

The fuel vaporization apparatus constructed as above is applicable not only to the starting apparatus of an internal combustion engine where liquid fuel such as vaporizedoline and alcohol is vaporized by using the heater, but to ones where vaporized fuel such as natural vaporized, LPG or hydrogen vaporized is supplied.

The second embodiment of the present invention for improving the startability of the engine is explained hereunder, using FIG. 3. The second embodiment has the similar construction as shown in FIG. 9 and is characteristic in a point that the port injection valve injects fuel additionally. Since this does not require the main air control valve 16 installed in the main passage 3 near the intake port 10 of each cylinder, the construction of the intake passage can be simplified.

Because the main air control valves 16 are not installed near the intake ports 10 in the main passage 3, as shown in FIG. 3(b), the engine speed at the beginning of cranking while the throttle valve 8 is at closed position, and the air remaining in the main passage 3, comprising the surge tank 2 and intake manifold 3a in the downstream of the throttle valve 8, flows into each cylinder as shown FIG. 3(c). For the aforementioned reason, as shown in FIG. 3(d), the air flowing in the bypass passage 4 decreases and vaporization of the fuel adhered onto the heater 15 is not facilitated. On the other hand, the heater 15 energizes on and the auxiliary injection valve 6 injects fuel in a similar manner as in the first embodiment, as shown in FIGS. 3(f) and 3(g), but, as shown in FIG. 3(h1), additional injection is given from each port injection valve 5 in the beginning of cranking at a timing corresponding to the period where the air flows in from the main passage 3.

Since each port injection valve 5 is located near the intake port 10, the injected fuel flows into the each cylinder 13 speedily and additional injection from the port injection valve 5 increases the incoming fuel quantity into the cylinder 13, as shown by a solid line in FIG. 3(i). And hence the time until ignition and complete explosion can be reduced and the startability can be improved remarkably. Besides, because the incoming fuel quantity into the cylinder reaches a required level very quickly, the amount of unburnt vaporized (HC) emitted until ignition can be reduced.

The length of period where the air flows in from the main passage 3 depends upon the passage volume in the downstream of the throttle valve 8 in the main passage, cylinder volume and cranking speed. According to the inventor's experiments using multiple engines, it is found that, at the state where the throttle valve 8 is closed, the air flows in from the main passage 3 and the fuel supply from the bypass passage 4 decreases for a period of 0.3 to 0.4 seconds from the start of cranking, actuated by energizing the starter motor. For this reason, additional injection from the port injection valves 5 shall be made at a timing within, at least, 0.4 seconds after the start of cranking actuated by energizing the starter motor. Besides, because the incoming air quantity from the main passage 3 decreases as shown in FIG. 3(c), and the incoming vaporized fuel quantity from the bypass passage 4 increases as the time elapses after the start of cranking shown in FIG. 3(d), the additional injection quantity from the port injection valve 5 shall be made maximum at the beginning of cranking and reduced as the time elapses after the start of cranking or additional injection be stopped.

As a result, excessive fuel condition, that caused if the fuel injected from the port injection valve 5 into the cylinder 13 is combined with the incoming vaporized fuel into the cylinder, is prevented. And adhesion of the fuel, injected from the port injection valve 5, onto the intake passage wall and intake valve can be minimized. Besides, since additional injection from the port injection valve 5is given at the beginning of cranking, most of the fuel adhered onto the intake passage wall during the additional injection evaporates before the engine is ignited and the engine speed increases. Accordingly, even if the fuel adhered onto the wall is vaporized drastically when the pressure of the intake passage decreases drastically due to rising of the engine speed and the air velocity increases at the intake port position, excessive fuel can be prevented and so increase of HC and CO can be prevented.

To be concrete, as shown in FIG. 3(h1), additional injection from the port injection valve 5 shall be given within 0.4 seconds from the start of cranking by the maximum injection quantity Fmax at the cranking period, after that, the injection from the port injection valve 5 is stopped, or reduced to a smaller injection quantity than Fmax (in the case, a period for injection by reduced injection quantity is provided after the injection by Fmax) as shown in FIG. 3(h2), (h3).

FIG. (h3) shows an example where, in addition to the additional injection from the port injection valve 5 at the beginning of cranking, another additional injection from the port injection valve 5 is given slightly before the ignition timing (in the middle and latter period of cranking), if the vaporized fuel supply from the bypass passage 4 is not enough to meet sharp increase of the engine intake air quantity resulting from the engine speed increase after ignition.

The above additional injection in the middle and latter period of cranking shall be given by a smaller injection quantity than Fmax applied at the beginning of cranking so as to prevent increase of HC due to adhesion of fuel onto the walls.

Detailed injection method of the port injection valve 5 at start-up is explained hereunder, using FIG. 4. The figure shows an example for 4-cylinders engine, where FIG. 4(a) shows the injection state of the auxiliary injection valve 6, FIG. 4(b) shows the injection state, in each stroke, of the port injection valve 5 on each cylinder, and these injections are given in the period where the injection signal becomes LOW. When a engine velocity (revolution) signal, that is generated each time when the crank shaft turns by a specified angle, is detected several times after the start of cranking actuated by energizing the starter, cranking is judged as started and the injection from each port injection valve 5 is begun as shown in 4(b). Although not shown, the heater 15 is energized during the engine cranking. These injections are begun after a revolution signal is detected several times so as to prevent the error action due to noise in the revolution signal. It is also acceptable that the operation signal of the starter is inputted and the injections from respective port injection valves 5 are begun when the starter operation start is detected.

FIG. 4(c) shows the injection quantity (total injection quantity in all cylinders) of the port injection valves 5 per one stroke period (180 degrees). In this explanation, as explained before, the maximum injection quantity of the port injection valves 5 throughout the cranking period is injected within 0.4 seconds after the start of cranking, at a timing corresponding to the period where the vaporized fuel supply quantity decreases because of the incoming air from the main passage 3 in the beginning of cranking. In this example, the injections are given from the port injection valves 5 in respective cylinders for one time when the revolution signal is detected. Herein, the injection quantity of the port injection valves 5 is regarded Fmax.

Since the vaporized fuel from the bypass passage 4 flows into the cylinder as the time elapses after the start of cranking, the injections from the port injection valves 5 shall be stopped after the injection by Fmax, as shown in a soled line in FIG. 4(c), or be reduced to a smaller injection quantity than Fmax as shown in a dotted line in Fig (c). Because of this, excessive fuel condition, to be caused if both the incoming injected fuel from the bypass passage 4 and the port injection fuel flow into the cylinder at the same time, can be prevented and, furthermore, the port injection fuel adhesion onto the wall can be reduced so as to prevent increase of HC and CO, to be caused if the adhered fuel evaporates drastically after the engine speed has increased.

A dotted line in FIG. 4(c) represents each additional injection from each port injection valve 5. The additional injection is performed from the middle period of cranking so as to meet sharp increase of the engine intake air quantity resulting from the engine speed increase after ignition. Thereby the fuel supply delay is prevented. The injection quantity of each port injection valve 5 shall not exceed Fmax.

FIG. 4(d) shows the ration $\eta$ of the injection quantity of the port injection valves 5 to the intake air quantity per one stroke period (180 degrees) in the embodiment. The injections are performed by $\eta_{max}$ so that the ratio $\eta$ becomes maximum in the beginning of cranking in the cranking period and, after the injections by $\eta_{max}$, the ratio $\eta$ is made zero (injection is stopped) or injection is made by lower ratio than $\eta_{max}$.

FIG. 4(e) shows an example of the ratio R of the injection quantity of the port injection valves 5 and that of the auxiliary injection valve 6 (injection quantity of the port injection valves 5/injection quantity of the auxiliary injection valve 6) per one stroke period (180 degrees). Wherein these injections are performed from the these injection valves at the maximum injection quantity ratio Rmax of the injection quantity ratio R in the cranking period within 0.4 seconds after the start of cranking, at a timing corresponding to the period where the incoming vaporized fuel quantity from the bypass passage 4 decreases because of the incoming air from the main passage 3.

After these injections at Rmax, the injection from each port injection valve 5 is stopped at a timing corresponding to the incoming vaporized fuel, as shown in a soled line in FIG. 4(e), or the injection is performed by a smaller injection quantity than Rmax, as shown in a dotted line in 4(e), so as to reduce adhesion of port injection fuel and prevent HC and CO emission under increased engine speed.

With a starting apparatus, in which each port injection valve 5 is provided near the intake port of each cylinder, and a means for supplying vaporized fuel is installed in the bypass passage 4, aiming to improve the combustibility by supplying vaporized fuel at start-up, as explained above, the vaporized fuel is supplied during cranking and additional injection is given from the port injection valves 5 in the beginning of cranking, and so the start-up time from the start of cranking to complete explosion can be reduced and startability be improved. Besides, by giving additional injection from the port injection valves 5 in the beginning of cranking and then decreasing the injection quantity from the port injection valves 5 at a timing corresponding to the incoming vaporized fuel into the cylinder, the engine startability can be improved and increase of HC and CO in exhaust vaporized can be prevented In this starting method, the throttle valve shall preferably be motor-driven type of which the opening can be controlled by a controller, but a mechanical type connected with the accelerator pedal by linkage is also acceptable. In the case a mechanical type throttle valve is used, it is acceptable that injection is given from the auxiliary injection valve 6 when an actuation action is made while the accelerator is not pressed (the throttle valve is at closed position) and that, when the accelerator is pressed, the injection is performed from each port injection valve 5 lest the incoming air into the bypass passage 4 should decrease and the startability deteriorate.

In this construction, it is needed that the air is positively let into the bypass passage 4 so as to facilitate the fuel vaporization, and that the air velocity in the bypass passage 4 is made faster so as to speed up the incoming vaporized fuel flow. As mentioned above, the throttle valve 8 in the main passage 3 shall preferably be fully closed at start-up, but not always limited. There is available a system where thermo-wax or the like that generally shrinks at lower temperature is employed as the valve actuator and so the throttle valve is made slightly open under a low temperature condition. In a system like this, the throttle valve 8 may be slightly opened so far as an amount of air sufficient to maintain the startability can be secured in the bypass passage 4.

Figure 5:
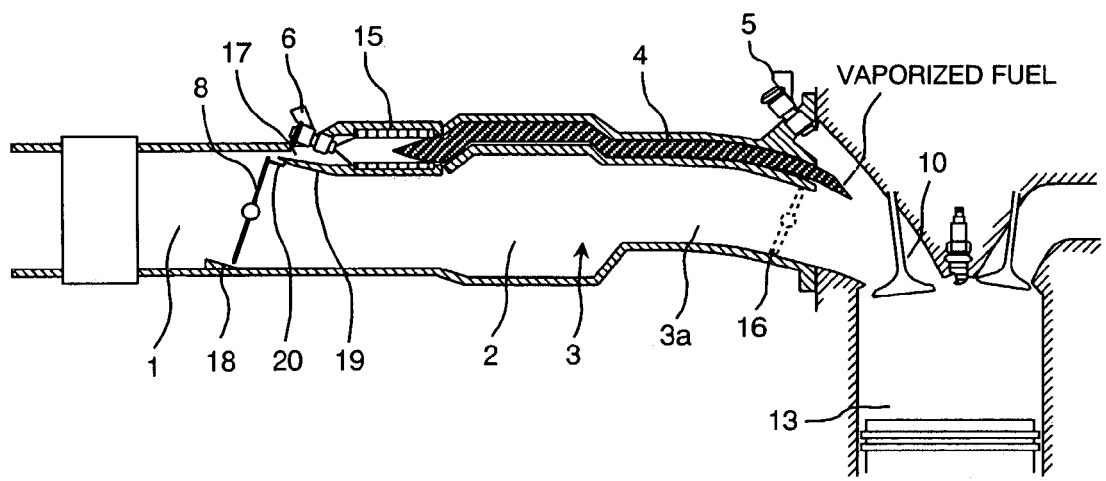
FIG. 5 is a structural drawing of main components showing the third embodiment of the starting apparatus of an internal combustion engine according to the present invention.

Furthermore, the first and second embodiments are applicable to the vaporized fuel supply apparatus shown in FIG. 5, which is the third embodiment of the present invention. In the construction shown in FIG. 5, the main passage 3 including the surge tank 2 and intake manifold 3a is formed in the downstream of the throttle valve 8. The bypass passage 4 is formed so as to bypass the main passage, and the bypass passage 4 is connected close to each intake port. On one end of the throttle valve 8 has a taper 18 so that the air coming into a clearance between the throttle valve 8 and intake passage 1, when the opening of the throttle valve 8 is small, is shut off. And an opening 17, comprising the intake passage 4 and partition 19, for letting in the air for the bypass passage 4 is provided at the other clearance between the throttle valve 8 and intake passage 1. Besides, in order to let the air into the bypass passage 4 when the throttle valve opening is small, a seal plate 20 for preventing leakage is installed on one side of the throttle valve 8 facing the opening portion 17 of the bypass passage 4. Each port injection valve 5 is installed near the intake port 10 of each cylinder. The auxiliary injection valve 6 and the heater 15 for vaporizing the injection fuel of the auxiliary injection valve are installed in the bypass passage 4.

The incoming air quantity into the bypass passage 4 is adjusted by the opening of the throttle valve 8. In this construction, therefore, the throttle valve 8 functions as a bypass air control valve. With this construction, because the incoming air into the main passage is shut off and the air is let into the bypass passage 4 side at the time of start-up or low-load condition (when the throttle valve opening is small) where the combustion is apt to deteriorate, the air velocity in the bypass passage 4 is increased and vaporization of fuel by the heater 15 and atomization of injection fuel from the auxiliary injection valve 6 are facilitated, and then vaporized fuel is supplied to the cylinder 13.

The first and the second embodiments are applicable also to this construction. If the first embodiment is applied, the main air control valve 16, comprising an air shut-off valve, is installed near the intake port 10 in the main passage 3, the incoming air from the main passage 3 into the cylinder is shut off at start-up. And then the air is let into the bypass passage 4 from the throttle valve 8 so that the air velocity in the bypass passage 4 is increased and the fuel vaporization by the heater 15 is facilitated in the beginning of cranking. Thus, the startability can be improved and the HC emission at start-up can be reduced. If the second embodiment is applied, the fuel injection is given from the auxiliary injection valve 6 at start-up and additional injection is given from the port injection valve 5 in the beginning of cranking, and hence the startability can be improved and the HC emission at start-up can be reduced.

Next, an example that applies the first to third embodiments of the present invention for the exhaust filtration performance is explained hereunder. The example is to prevent the deterioration of performance, due to heat, of the exhaust filtration apparatus for the engine and to realize stable exhaust filtration performance throughout long drive of the vehicle.

A generally known exhaust filtration apparatus for an engine is disclosed in the Japanese Application Patent Laid-open Publication No. 2000-8834 etc. The exhaust filtration apparatus comprises a catalytic converter rhodium. In the apparatus, at the time of cold start of the engine (Engine starting before being warmed), unburnt vaporized (HC) emitted before the catalytic converter rhodium is heated and activated is once absorbed into absorbents, and then discharged at a timing of the activation of the catalytic converter rhodium so that the discharged HC can be filtered through the catalytic converter rhodium.

Figure 6:
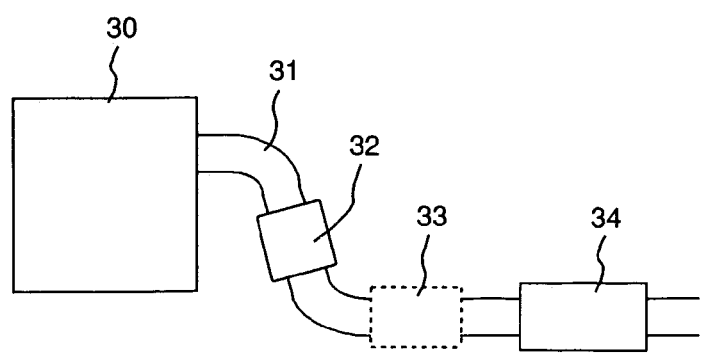
FIG. 6 is a structural drawing of main components showing the exhaust filtration apparatus, using HC absorbent, according to the present invention.

An example exhaust filtration apparatus using absorbent is shown in FIG. 6. On the exhaust pipe 31 of the engine 30, in sight of the upstream, support containers 32, 33 and 34 are located in order. Catalyst supports made to hold catalytic converter rhodium are filled in the containers, and catalyst supports made to hold HC absorbents are filled in each support containers 33 and 34. It is also acceptable to so construct the apparatus that the support container 33 is eliminated and the catalyst supports made to hold HC absorbent are filled in a single support container 34.

There are several different constructions available for the support container in which the catalyst supports made to hold HC absorbents are filled. One used in this embodiment employs multiple support containers, but other employs a single support container. In some other, the same supports for catalytic converter rhodium in the support container 32 or other supports in the support container 32 may be made to hold HC absorbents. The catalyst supports made to hold HC absorbents or another supports in the downstream hold catalytic converter rhodium or catalytic converter oxidation so as to filter HC emitted from HC absorbents.

With a construction where no HC absorbents are employed, HC emitted from the engine just after cold start is not filtered but discharged into the air as it is because the catalytic converter rhodium in the container 32 has not been heated yet. On the contrary, with an exhaust filtration apparatus made to hold HC absorbents, HC emitted before the catalytic converter rhodium in the container 32 is activated is once absorbed in the HC absorbents, HC is discharged from the HC absorbents at a timing when the catalytic converter rhodium, that held in the same supports for the HC absorbents or other downstream catalyst supports, is activated. And then HC can be filtered by the catalytic converter rhodium. With the exhaust filtration apparatus as above, there arises a problem that, because the heat-resistant temperature of the HC absorbents such as zeolite is low, absorption capacity deteriorates after repeated high-speed driving, and consequently HC emission increases.

Most of HC, emitted before the catalytic converter rhodium in the container 32 is activated, results from delayed ignition or incomplete combustion due to the fuel supply delay at start-up (adhesion of fuel onto the intake passage of delayed fuel supply into the cylinder because of slow vaporization). Because of this, if the starting apparatus of an internal combustion engine of the present invention, which is constructed as shown in FIG. 1, FIG. 5 or FIG. 9 and performs start-up as shown in FIGS. 3 and 4, is provided on the engine 30, the fuel supply delay at start-up can be eliminated, and the amount of HC emitted from the engine 30 before the activation of the catalytic converter rhodium in the support container 32 can be reduced remarkably, as explained above, as compared to an ordinary apparatus that supplies fuel only from the port injection valves 5 at start-up or to a conventional apparatus that supplies vaporized fuel at start-up.

As a result of the above, HC absorbents that used to be held in a conventional apparatus can be disused or the amount of HC absorbents to be held can be reduced, and also deterioration of filtration performance that is apt to be caused due to high temperature in an exhaust filtration apparatus containing absorbents can be prevented or reduced.

For example, since the construction shown in FIG. 6 does not require to hold HC absorbents, it is possible to utilize such catalyst as catalytic converter rhodium holding no HC absorbents. Or it is possible to achieve filtration by holding HC absorbents in catalyst supports filled in only a single support container instead of two support containers 33 and 34. Thus, increase of HC emission resulting from the deterioration due to high temperature can be controlled. And the construction of the exhaust filtration apparatus can be simplified, improving layout freedom of a car.

For the apparatus that equipped with plural support containers housing catalyst supports, it may be constructed as follows. Namely, the HC absorbents on the catalyst supports of the support containers, which is installed on the upstream side (it is particularly subjected to high temperature) of the exhaust pipe, is disused. And the catalyst supports in any one of the support containers that are installed in the downstream, as compared to the support container 31 installed most upstream, is made to hold HC absorbent.

Thus deterioration due to high temperature can further be controlled.

Figure 7:
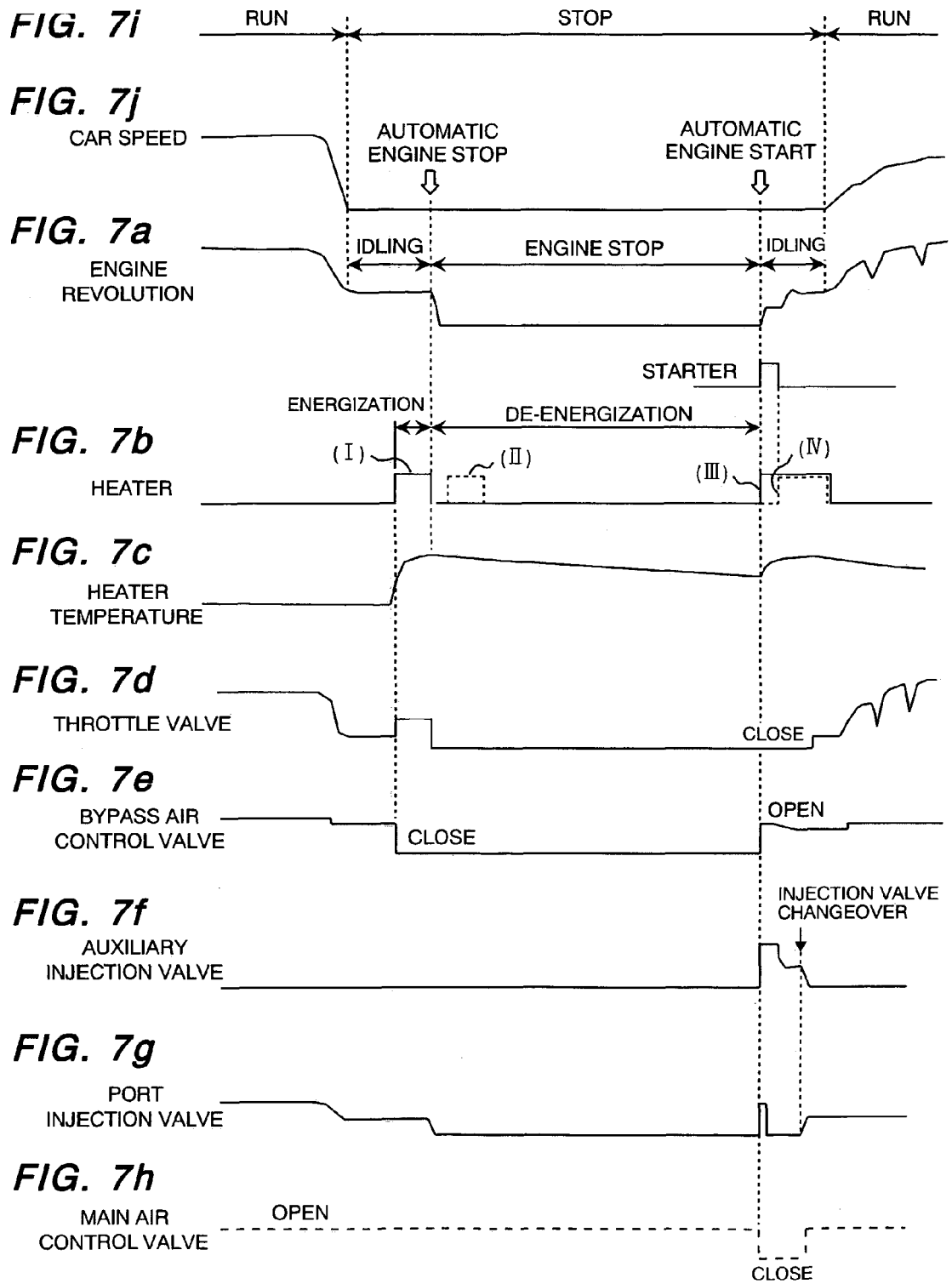
FIG. 7 is a timing chart of the present invention when applied to an idling stop system.
Figure 8:
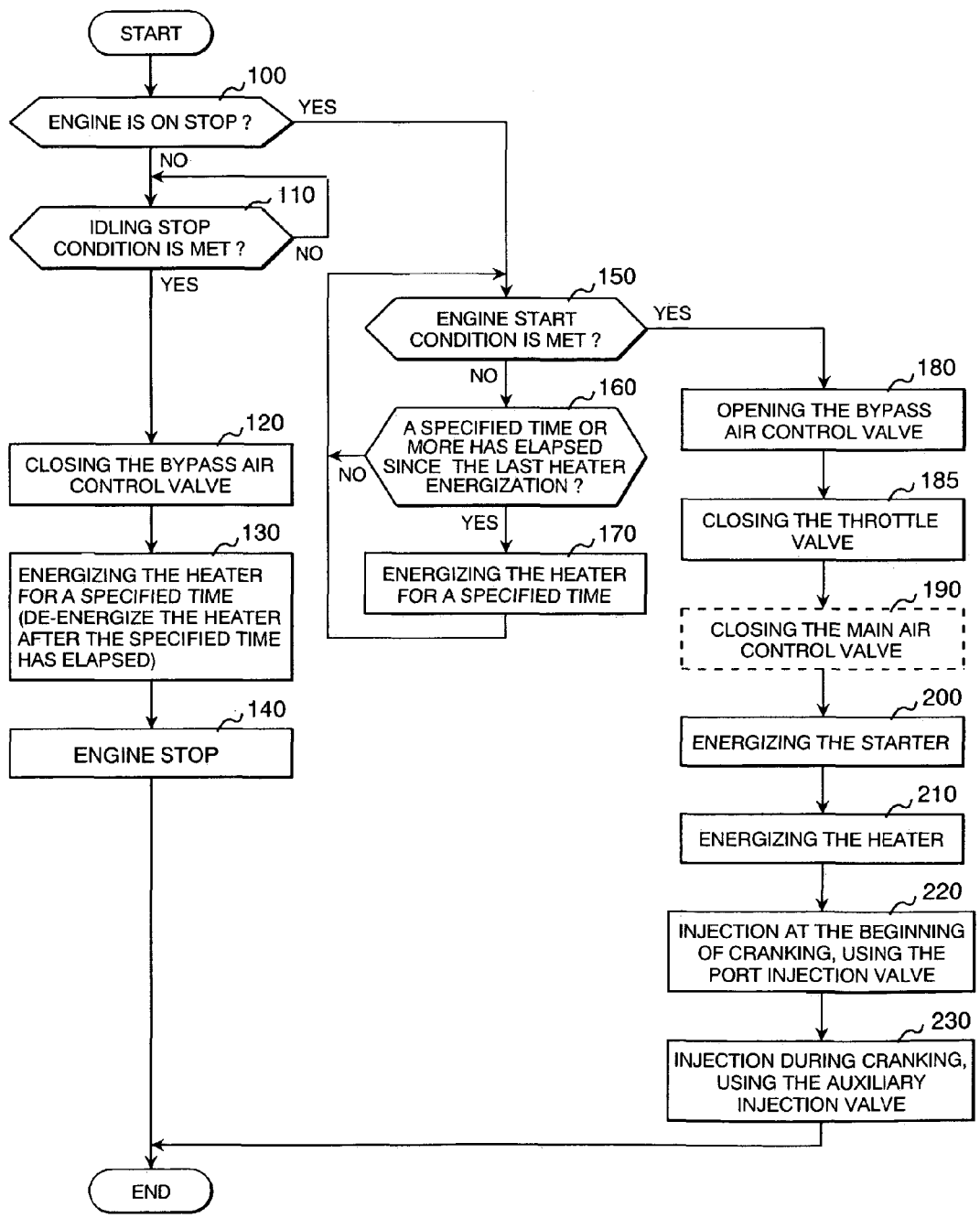
FIG. 8 is a control flowchart in the idling stop system shown in FIG. 7.

Next, an embodiment of the control method of an idling stop system to which the starting apparatus of the present invention applies is explained hereunder, using FIGS. 7 and 8. A generally known idling stop system is such that the engine is stopped automatically when a car stops at a crossing or the like and then restarted at next start of the car so as to improve the fuel consumption. In a conventional system, injection is given from the port injection valves 5 at the time of restart. But, in the case of injection from the port injection valves 5, there remains fuel adhered inside of the cylinder 13 and inside of the intake passage not only in cold state but also after warming up. And because the air velocity in the main passage 3 is low at start-up, vaporization of the fuel adhered onto the wall is not facilitated even if the temperature of the intake passage wall is high. Therefore air-fuel mixture becomes insufficient around the ignition plug. For this reason, in order to secure the ignitability and combustibility, it is necessary to increase fuel supply quantity at start-up, which leads to a problem that fuel consumption cannot be improved satisfactorily.

On the contrary, with a construction where the bypass passage 4 is equipped with the auxiliary fuel injection valve 6 and heater 15, vaporization of fuel is facilitated sufficiently because of high temperature caused by the heater 15 at start-up and high velocity air flow generated in the bypass passage 4 of which passage area is smaller than that of the main passage 3. Hence no fuel adheres onto the downstream intake passage and cylinder. As above, since it is no longer necessary to increase the fuel supply, fuel consumption can be improved remarkably.

In an idling stop system, however, quick engine start-up is needed at every start of the car, but high startability necessary for the idling stop system cannot be achieved with a conventional system supplying vaporized fuel. By applying the present invention to a fuel supply apparatus supplying-vaporized fuel, starting the engine from an idling stop state becomes possible, using vaporized fuel, and hence fuel consumption can be improved remarkably, maintaining satisfactory startability.

In FIG. 7, where FIG. 7(*a*) shows the engine speed (revolution), the engine is stopped automatically when a car makes a stop after driving and a specified idling stop condition is satisfied. On this occasion, the heater 15 is energized (pre-heated) for a specified length of time. The reason for energizing of the heater 15 as above is to heat up the heater 15 beforehand so that vaporized fuel can be supplied to the engine as soon as the car makes a start. Pre heating shall begin just before or just after the engine stop and last for about several seconds until the PTC heater is heated up.

With a construction of the present invention where additional injection is given from the port injection valves 5 at the time of cranking, the fuel from the port injection valves 5 flows into the cylinder in the beginning of cranking and, because the air velocity in the bypass passage 4 is high, the fuel vaporization is facilitated so far as the heater 15 is heated up satisfactorily. Thus, the startability can be ensured accordingly. For example, if the PTC heater is heated up to about 120° C., compared to its normal temperature of 170° C., sufficient startability is ensured. Forth is reason, it is not necessary to continue energizing the heater 15 from engine stop up to next start-up. And, because the startability can be maintained even if the heater temperature decreases slightly due to heat radiation after turn-off. Thereby the power consumption of the heater 15 can be reduced by non-energizing the heater 15 until the next start-up after turning on it for a specified length of time, as shown in FIG. 7(*b*) and FIG. 7(*i*).

In this embodiment, as shown in FIG. 7(*e*), in order to save the power consumption while the car is on stop and the engine is under idling, the bypass air control valve 7 is closed during the heater energizing on so that no air flows into the heater 15 and heat radiation from the heater 15 is reduced. Besides, it is permissible to energize the heater 15 for a specified length time after engine stop as shown in FIG. 7(*b*) (ii) because no air flows into the heater and heat radiation is less after the engine stop.

Then, when a specified engine restart condition is satisfied after idling stop, for example, when pressure onto the clutch pedal is detected with the changeover gear being set at Neutral, as shown in FIG. 7(*d*), the throttle valve is closed and, as shown in FIG. 7(*e*), the bypass air control valve 7 is opened, and, at the same time, the starter motor energizing is begun, and as shown in FIG. 7(*b*)(iii), turn on the heater 15. Besides, as shown in FIG. 7(*f*), the injection from the auxiliary injection valve 6 is begun immediately after cranking start, and as shown in FIG. 7(*g*), the addition injection is given from the port injection valves 5 in the beginning of cranking.

In this operation, in order to avoid deterioration of the startability due to reduced starter current that may be caused if the heater 15 is energized during cranking, it may be operated as follows. That is, the heater 15 is energized during cranking or in a period from cranking start to complete explosion, and begin energizing the heater 15 only after completion of starter energizing or after complete explosion. If this is applied, fuel vaporization at start-up is achieved by residual heat of the preheated heater 15

Besides, with a construction where the main air control valve 16 is installed in the main passage 3 shown in FIG. 1, the main air control valve is closed during cranking shown in FIG. 7(*h*), to shut off the incoming air from the main passage 3 and, after cranking, vaporized fuel is supplied to the cylinder as soon as possible. In order to further improve the startability, a construction using the main air control valve of the present invention is employed together with a control method in which additional injection is given from the port fuel valves 5 in the beginning of cranking.

The current through the heater 15 increases as the fuel quantity increases, and the durability of the heater relay deteriorates if the breaking current of the relay is high. In this embodiment, considering above mentioned problem and considering some delay time needed until complete vaporization of fuel on the heater 15, the heater is stopped in a specified delay time after the injection quantity from the auxiliary injection valve 6 has decreased.

FIG. 8 shows the control flowchart. When the engine is judged not on stop in step 100, whether a specified idling stop conditions are satisfied or not is judged in step 110. An example of the idling stop conditions include such that the car is on stop after a drive history, that the engine cooling water temperature is higher than 60° C. and the outside air temperature is higher than 0° C., that the air-conditioner is not in operation, that the battery voltage has not dropped, that any failure of the heater 15, bypass air control valve 7, auxiliary injection valve 6, and other components is detected, and that, in the case of an MT car, the changeover gear is set to Neutral and the clutch is in an open state. If all these conditions are satisfied, the bypass air control valve 7 is closed in step 120, and the heater 15 is energizing for a specified length of time to increase the temperature of the heater 15 in step 130 so that the fuel vaporization can be achieved quickly at the next start-up.

In this embodiment, the conditions for energizing the heater 15 after the car makes a stop represent the idling stop conditions explained above. Then, step in 120, the bypass air control valve 7 is closed while the heater is being energized on so as to shut off the incoming air into the heater and to prevent increased power consumption due to the heat radiation by the air flow.

After the heater is energized for a specified length of time, the energizing to the heater 15 is stopped to save power consumption of the heater 15. After energizing the heater, the ignition and the fuel injection are terminated and the engine is stopped automatically in step 140. As explained above, the energization of the heater 15 may be begun after the engine stop.

After the engine stop, whether a specified engine start conditions is satisfied or not is judged in step 150. An example engine start conditions includes such that the changeover gear is set to Neutral and pressure on the clutch pedal is detected or the accelerator pedal is pressed, and that negative pressure of the brake booster has decreased. When the engine start conditions are not satisfied, whether specified time Tr or more has elapsed or not since the last heater energizing is judged in step 160. If a specified time or more has elapsed, the heater temperature is regarded to have become lower than necessary temperature for the next start-up, and the heater is energized again in step 170 to heat up the heater 15.

The specified time Tr for judging the necessity of re-energizing the heater may be a function measured valued such as the outside air temperature, the engine cooling water temperature or the battery voltage. It is also acceptable to estimate the heater temperature from these parameters together with the time elapsed since the last heater energizing, and to energize the heater again if the estimated temperature is lower than necessary for ensuring the startability.

Furthermore, in the case that the time elapsed since the engine stop is extremely long, it is also acceptable not to operate re-energizing of the heater but to utilize injection from the port injection valve 5 in the next engine start-up so as to prevent the battery capacity reduction. In the case that the battery capacity has dropped for some other reasons and is not enough to heat up the heater 15, it is also acceptable to utilize injection from the port injection valve 5 in starting the engine.

When the engine start conditions are satisfied in step 150, the bypass air control valve is opened in step 180 and the throttle valve is closed in step 185. With a construction where the main air control valve is installed near the intake port of the main passage 3, the main air control valve 7 is closed in step 190. Almost at the same time, the starter motor emerging is begun in step 200. Just after the starter motor energizing, the heater energizing 15 is begun in step 210. Since high rush current runs in the beginning of starter motor energizing, it is acceptable to avoid this beginning period with high rush current and energize the heater 15 after that.

Besides, as explained above, it is also acceptable not to energize the heater 15 during cranking so as not to deteriorate the startability due to reduced starter current that may be caused by heater energizing but to begin energizing the heater 15 only after complete explosion. In step 220, as explained before as an example, additional injection of a specified quantity from the port injection valves 5 is begun only after the cranking starts and engine revolution signals are detected. In step 230, the injection from the auxiliary injection valve 6 is given during cranking so as to supply vaporized fuel.

Since the fuel vaporization characteristic in the beginning of start-up cranking depends upon the heater temperature, the intake temperature and the air velocity in the bypass passage 4, it is acceptable to calculate the heater temperature as a function of the heater energizing time, the elapsed time after the heater energizing, the battery voltage, the outside air temperature, and the engine cooling water temperature, and to obtain the estimated temperature and to correct the injection quantity from the auxiliary injection valve 6 and port injection valve 5 accordingly from the estimated temperature. Besides, it is also acceptable to correct the injection quantity from the auxiliary injection valve 6 and port injection valve 5 based on the detected values of the intake temperature, the intake air quantity and the engine cooling water temperature.

If the present invention is applied to an idling stop system as above, the startability can be ensured and, because the supply of vaporized fuel does not cause fuel adhesion on the intake passage wall and the cylinder wall, the fuel supply quantity at start-up can be reduced and the fuel consumption can be remarkably improved as compared to a conventional construction where the engine is started only with injection from the port injection valves 5.

The starting apparatus of the present invention employs an electric heater but not limited. The apparatus is applicable also to a heater that introduces hot water or EGR vaporized for heating purpose around the bypass passage 4 near the auxiliary injection valve 6, excluding the energizing control of the heater.

In the case of a heater that introduces hot water around the bypass passage 4, the heater temperature becomes only about 80 to 90° C. even after warming up. In the bypass passage 4 of which the passage area is smaller than that of the main passage 3, however, since high velocity air flow is generated by throttling the throttle valve in the main passage 3, the fuel vaporization at start-up can be facilitated even with the heater utilizing hot water and so fuel consumption can be improved as compared to a conventional construction where the engine is started only with injection from the port injection valve 5.

Each embodiment described above shows an example applied to an engine equipped with a port injection valve 5, but it is applicable also to a so-called cylinder injection engine that is equipped with an injection valve inside the cylinder, wherein supplying vaporized fuel at the time of start-up is effective to prevent deterioration of ignitability and combustibility. Because it is necessary to secure startability also in this case, a construction of the present invention is applicable.

(Effects of the Invention)

With a starting apparatus that is designed to improve combustibility by providing a means for supplying vaporized fuel in the bypass passage 4 installed in parallel to the main passage 3, wherein the main air control valve 16 installed near the intake port of the main passage 3 is closed at the time of start-up. Thereby the fuel vaporization by the heater 15 installed in the bypass passage 4 can be facilitated from the beginning of cranking and also intake delay of the vaporized fuel can be reduced, and so the startability can improve and the amount of HC emission can decrease.

Besides, by giving the additional injection from the port injection valves 5, installed near the intake port of each cylinder, in the beginning of cranking, the time required from the beginning of cranking up to complete explosion can be reduced, and so the startability can improve and the amount of HC emission can decrease.

Furthermore, because the amount of HC emission at start-up can be decreased by the starting apparatus of the present invention, the use of HC absorbent of which the performance is apt to deteriorate due to high temperature can be eliminated, or the amount of HC absorbent to be held can be reduced. Thus, the deterioration of the filtration performance of an exhaust filtration apparatus can be prevented or reduced.

Besides, because quick start-up of an engine using vaporized fuel becomes possible with the aid of the starting apparatus of the present invention, it becomes possible in an idling stop system to start up the engine using vaporized fuel from the idling stop state. Thus, the fuel consumption can be improved remarkably while satisfying required startability.

As a result of having improved the startability with the fuel supply apparatus of the present invention, the time for energizing the heater 15 can be reduced, and hence power consumption of the heater can be saved.

What is claimed is:

1. A starting apparatus of an internal combustion engine comprising:
    a main air passage including an intake manifold for supplying air to each cylinder of the engine,
    a bypass air passage provided in parallel to the main air passage and connected close to the intake port of each cylinder,
    a bypass air control valve that is capable of controlling the incoming air quantity into the bypass air passage and opened at the time of start-up cranking,
    a vaporization fuel supply means for supplying vaporized fuel to the bypass air passage, and
    fuel injection valves that are installed near respective intake ports of cylinders of the engine or installed directly in respective cylinders, and inject the maximum fuel quantity of themselves available in the cranking period within a specified length of time after the beginning of start-up cranking, and then decreases the injected fuel quantity or stops injection in the rest of the cranking period after injecting the maximum fuel quantity.

2. An exhaust filtration apparatus installed in an exhaust pipe of an internal combustion engine equipped with the starting apparatus according to claim 1, wherein the exhaust filtration apparatus comprises a catalyst that holds no HC absorbent.

3. An exhaust filtration apparatus installed in an exhaust pipe of an internal combustion engine equipped with the starting apparatus according to claim 1, wherein the exhaust filtration apparatus has one or more support containers on the exhaust pipe, and the catalyst supports filled into one of the support containers hold HC absorbents.

4. An exhaust filtration apparatus installed in an exhaust pipe of an internal combustion engine equipped with the starting apparatus according to claim 1, wherein the exhaust filtration apparatus has plural support containers in the exhaust pipe, and the catalyst supports filled into any one of the support containers, that are located in the downstream of the exhaust pipe compared to the support container located in most upstream of the same, hold HC absorbents.

5. A starting method of an internal combustion engine comprising: a main air passage including an intake manifold for supplying air to each cylinder of the engine, fuel injection valves that are installed near respective intake ports of cylinders of the engine or installed directly in respective cylinders, a bypass air passage provided in parallel to the main air passage and connected close to the intake port of each cylinder, a vaporization fuel supply means for supplying vaporized fuel to the bypass air passage, and a bypass air control valve capable of controlling the incoming air quantity into the bypass air passage,
    wherein at the time of start-up cranking, the bypass air control valve is opened and vaporized fuel is supplied to the bypass air passage from the vaporization fuel supply means, and the fuel injection valves inject the maximum fuel quantity of themselves available in the cranking period within a specified time after the beginning of start-up cranking, and a time for decreasing the injected fuel quantity or stopping the injection is set in the rest of the cranking period after injecting the maximum fuel quantity.

6. A control method of an internal combustion engine equipped with a starting apparatus comprising a main air passage including an intake manifold for supplying air to each cylinder of the engine, a bypass air passage provided in parallel to the main air passage and connected close to the intake port of each cylinder, a vaporization fuel supply means for supplying vaporized fuel to the bypass air passage, and a bypass air control valve capable of controlling the incoming air quantity into the bypass air passage and in which main air control valves for the main air passage are provided near intake ports in respective pipes of the intake manifold, the control method comprising:
    stopping the internal combustion engine automatically when specified idling stop permissible conditions are satisfied,
    opening the bypass air control valve and actuating the start-up cranking when the specified engine start conditions are satisfied after the engine has stopped by satisfaction of the specified idling stop permissible conditions, and
    supplying the vaporized fuel to the bypass air passage from the vaporization fuel supply means during start-up cranking.

7. A control method of an internal combustion engine equipped with a starting apparatus comprising a main air passage including an intake manifold for supplying air to each cylinder of the engine, a bypass air passage provided in parallel to the main air passage and connected close to the intake port of each cylinder, a vaporization fuel supply means for supplying vaporized fuel to the bypass air passage, and a bypass air control valve capable of controlling the incoming air quantity into the bypass air passage, in which main air control valves for the main air passage are provided near intake ports in respective pipes of the intake manifold, and in which the vaporization fuel supply means comprises an auxiliary fuel injection valve and a heater for heating the fuel injected from the auxiliary fuel injection valve, the control method comprising:
    stopping the internal combustion engine automatically when the specified idling stop permissible conditions are satisfied,
    energizing the heater for a specified time when the specified heater energization conditions are satisfied, setting a non-energization period of the heater after energization of the heater for the specified time, actuating start-up cranking when the specified engine start conditions are satisfied after the internal combustion engine has stopped by the satisfaction of the idling stop permissible conditions, and supplying vaporized fuel to the bypass air passage from the vaporization fuel supply means during start-up cranking.

* * * * *